US009560861B2

(12) United States Patent
Lucey et al.

(10) Patent No.: US 9,560,861 B2
(45) Date of Patent: Feb. 7, 2017

(54) METHODS OF REMOVING LIPID FROM A PROTEIN AND LIPID-CONTAINING MATERIAL

(75) Inventors: John A. Lucey, Madison, WI (US); Iswandi Jarto, Jakarta Utara (ID); Karen E. Smith, Madison, WI (US); Srinivasan Damodaran, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 96 days.

(21) Appl. No.: 12/494,894

(22) Filed: Jun. 30, 2009

(65) Prior Publication Data

US 2010/0028525 A1 Feb. 4, 2010

Related U.S. Application Data

(60) Provisional application No. 61/079,186, filed on Jul. 9, 2008.

(51) Int. Cl.
| | | |
|---|---|---|
| *A23C 9/142* | (2006.01) | |
| *A23C 7/04* | (2006.01) | |
| *A23C 21/00* | (2006.01) | |
| *A23J 1/20* | (2006.01) | |

(52) U.S. Cl.
CPC ............ *A23C 9/1425* (2013.01); *A23C 7/043* (2013.01); *A23C 21/00* (2013.01); *A23J 1/205* (2013.01); *A23L 5/273* (2016.08); *A23V 2002/00* (2013.01); *A23V 2300/34* (2013.01); *A23V 2300/40* (2013.01)

(58) Field of Classification Search
CPC ............................. A23C 9/1425; A23C 21/00
USPC .... 426/656, 271, 478, 491, 583, 33, 41, 417
See application file for complete search history.

(56) References Cited

U.S. PATENT DOCUMENTS

| | | | |
|---|---|---|---|
| 5,436,014 A | | 7/1995 | Damodaran |
| 5,747,031 A | * | 5/1998 | Ruch et al. ............... 424/130.1 |
| 2004/0142086 A1 | * | 7/2004 | Kopf et al. ................ 426/582 |
| 2006/0172058 A1 | * | 8/2006 | Achs ........................... 426/657 |
| 2007/0104847 A1 | * | 5/2007 | O'Mahony et al. ......... 426/582 |
| 2007/0192878 A1 | * | 8/2007 | Perreault ........................ 800/6 |
| 2007/0207187 A1 | * | 9/2007 | Yajima et al. ............... 424/439 |
| 2008/0305235 A1 | * | 12/2008 | Gao et al. ..................... 426/565 |

FOREIGN PATENT DOCUMENTS

| | | |
|---|---|---|
| EP | 0 243 544 A1 | 4/1987 |
| JP | 03278817 A2 | 12/1991 |
| WO | WO 93/20713 | 10/1993 |

OTHER PUBLICATIONS

Dattatreya et al., "Kinetics of Browning During Accelerated Storage of Sweet Whey Powder and Prediction of its Shelf Life," *Int. Dairy J.*, 17:177-182 (2007).
Halling, "Protein-Stabilized Foams and Emulsions," *CRC Critical Reviews in Food Science and Nutrition*, 15:155-203 (1981).
Hammond et al., "Colorimetric Method for Residual Annatto in Dry Whey," *J. Dairy Sci.*, 58:1365-1366 (1975).
Hwang and Damodaran, "Selective Precipitation and Removal of Lipids from Cheese Whey Using Chitosan," *J. Agric. Food Chem.*, 43:33-37 (1995).
Jarto, "Production of WPC80 with Reduced Concentration of Residual Lipids to Improve Clarity, Functionality, and Flavor," M.S. Thesis, University of Wisconsin—Madison (2009).
Karleskind et al., "Foaming Properties of Lipid-Reduced and Calcium-Reduced Whey Protein Concentrates," *J. Food Sci.*, 60(4):738-741 (1995).
Lee, et al., "Formation of Volatile Compounds in Whey Protein Concentrate During Elevated Temperature Storage as a Function of Water Activity," *Int. Dairy J.*, 6:485-496 (1996).
Morr and Ha, "Off-Flavors of Whey Protein Concentrates: A Literature Review," *Int. Dairy J.*, 1:1-11 (1991).
Morr and Ha, "Whey Protein Concentrates and Isolates: Processing and Functional Properties," *CRC Critical Rev. Food Sci. Nutr.*, 33(6):431-476 (1993).
Pearce et al., "Reduction of Lipids in Whey Protein Concentrates by Microfiltration—Effect on Functional Properties," CSIRO Division of Food Processing, *IDF Special Issue* 9201, 118-129 (1992).
Sattar and deMan, "Photoxidation of Milk and Milk Products: A Review," *CRC Critical Rev. Food Sci. Nutr.*, 7:13-37 (1975).
Shahidi et al., "Food Applications of Chitin and Chitosans," *Trends in Food Science & Technology*, 10:37-51 (1999).
Son et al., "Rhubarb Juice as Natural Antibrowning Agent," *J. Food Sci.*, 65(7):1288-1289 (2000).
Venkatachalam et al., "Role of Protein and Lactose Interactions in the Age Gelation of Ultra-High Temperature Processed Concentrated Skim Milk," *J. Dairy Sci.*, 76:1882-1894 (1993).
Walstra et al., *Dairy Science and Technology*, $2^{nd}$ ed., Published by Taylor & Francis (2006).
International Search Report received in related PCT Application No. PCT/US2009/049206 dated Oct. 9, 2009.
Brans et al., "Membrane fractionation of milk: state of the art and challenges," J. Memb. Sci. 243:263-272 (2004).
European Office Action for Application No. 09 790 000.5-2114, dated Aug. 24, 2012; 6 pages.

* cited by examiner

*Primary Examiner* — Jenna A Watts
(74) *Attorney, Agent, or Firm* — Daniel A. Biasiole; Joseph T. Leone; DeWitt Ross & Stevens, S.C.

(57) ABSTRACT

Novel methods for producing whey protein concentrates with favorable properties are provided. The methods include using chitosan selective precipitation whey pre-treatment, and microfiltration using polymeric membranes. The products obtained using these methods include WPC80 with low fat content, high clarity, low browning potential during storage, and having low levels of volatiles. Compositions and foaming agents obtained using the methods of the present invention are also provided.

11 Claims, 11 Drawing Sheets

Control (clarified whey)   After chitosan pre-treatment

METHODS OF REMOVING LIPID FROM A PROTEIN AND LIPID-CONTAINING MATERIAL

CROSS-REFERENCE TO RELATED APPLICATIONS

This invention claims priority to U.S. Provisional Patent Application Ser. No. 61/079,186, filed Jul. 9, 2008, which is herein incorporated by reference.

FIELD OF THE INVENTION

The present invention relates generally to the field of production of whey products.

BACKGROUND

Whey protein, particularly in the form of whey protein concentrate (WPC), is a significant by-product of the cheese making process. Whey protein contains all the essential amino acids in the correct proportions to support growth, muscle regeneration, and promote rapid recovery after exercise. The amino acid profile of whey protein encourages food digestion and transport of the protein to where it is needed in the body. Flavorless WPC functions in products as a source of proteins, as an emulsifier, foaming agent, thickener, etc. The gel-forming and water-binding properties, as well as the inherently bland flavor of whey protein concentrate, make it an attractive food ingredient when formulating lower-fat meat products.

Whey protein concentrate 80 (WPC80) contains about 80% protein and is typically produced by extensive ultrafiltration (UF) and diafiltration to reduce the non-protein components, especially the lactose content. Microfiltration (MF) may also be used to reduce the residual fat content. WPC80 has become a popular high protein WPC in that it has a mild flavor profile, good nutritional content (less lactose, low fat, and high protein level), is soluble over a wide pH range, and is used for protein fortification in food applications. The typical composition of WPC80 includes: 80-82% protein; 4-8% lactose; 4-8% fat; 3-4% ash; and 3.5-4.5% moisture. WPC80 has good gelling, emulsification, water binding, and nutrient enrichment characteristics. WPC80 is slightly higher in fat and lactose than another high protein source, whey protein isolate (WPI), but is an economical source of protein for nutritional or functional products. WPC80 is used in dairy, bakery, meat, snack, confectionary and other food and nutritional products, infant formulas, sports nutrition, energy bars, low carbohydrate diet formulas, yogurt, ice cream, dry mixes, sausage and meat products, and as an egg albumen replacer in bakery products.

WPC80 should have little flavor apart from a clean, mild dairy flavor. However, commercial WPCs exhibit a wide variation in functional properties even from the same processing plant, which can hinder its use in food applications. Flavor variability including the presence of oxidized off-flavor is a major concern for end-users of WPC products and it limits their usage. It is likely that the major sources of off-flavors in WPC products include feed, lipolysis, lipid oxidation, riboflavin decomposition and the Maillard reaction and the contribution of each of these factors to off-flavors presumably varies with different manufacturing processes and factories. Although most WPC products are generally tasteless immediately after drying, some powders develop a typically stale off-flavor during storage due to a set of complex, inter-related chemical reactions that include lipid oxidation and Maillard browning (Morr and Ha, 1991, *Int. Dairy J.* 1:1-11). There is little information on the volatile organic compounds responsible for off-flavors in high protein WPC products, and differences in liquid whey flavor have been attributed to differences in milk source, processing and handling and starter culture blend. Bleaching of whey from colored cheese is often performed to reduce color and increase whiteness (Hammond et al., 1975, *J. Dairy Sci.* 58: 1365-1366). Unfortunately bleaching of whey could also contribute to off-flavor development. WPC with increased whiteness that is maintained during storage is an important desirable attribute for many food applications, and bleaching is not preferred due to possible off-flavors that can arise.

Indeed, WPC has some undesirable properties, such as low foam formation, and poor foam stability believed to occur due to its high lipid content (Karleskind et al., 1995, *J. Food Sci.* 60: 738-741). Despite all the value of WPC in foods and feed, the variabilities in whey performance, flavor, color and functionality, are major obstacles limiting the use of whey in food applications. Consistent quality is required for use of WPCs in foods. In particular, consistent quality, tasteless WPC is required in the high protein nutritional segment that WPC80 (80% protein) is often used in. Inconsistent batch-to-batch variation results in waste and operational complexity in the use of WPCs.

The residual lipid fraction in WPC products largely includes triacylglycerol (53-63%) and phospholipids (PLs) or lipoproteins (13-23%) that originate from milk fat globule membrane. Cheese whey is commonly separated/clarified (centrifuged) to remove residual curd fines and milk fat globules but these processes do not remove phospholipo-protein complexes and the smallest milk fat globules. Due to their extremely small size and density, these residual lipids fractions remain after clarification. As a result they are concentrated with the protein during the ultrafiltration process. The residual lipids fractions can bind to the UF membrane due to their amphoteric and amphophilic properties, which usually lead to the fouling and significantly decreased permeate flux and increased cleaning cycles. These residual lipids present in whey powder limit the acceptable storage shelf life of whey protein products since they are thought to promote undesired odor development (e.g. oxidation end products) during storage.

Studies on whey turbidity have suggested that turbidity of untreated whey is mainly caused by light scattering of micron-sized fragments of milk fat globule membranes that remain dispersed in a stable colloidal form (Hwang and Damodaran, 1995, *J. Agric. Food Chem.* 43: 33-37). The lipid fraction of whey is the main cause of whey turbidity and consists of small fat globules, lipoprotein particles, and milk fat globule membrane fragments. Studies on whey powder flavor variability have suggested that off-flavor development during storage is primarily caused by lipid oxidation and Maillard browning reactions (Morr and Ha, 1991, *Int. Dairy J.* 1:1-11). Maillard browning reactions of protein and lactose could possibly be catalyzed by the lipid oxidation. Phospholipids are rather easily oxidized during storage and phospholipids may become precursors of off-flavors development in powdered products (Sattar and deMan, 1975, *CRC Critical Rev. Food Sci. Nutr.* 7:13-37). It is extremely difficult to remove all lipids from whey but numerous methods attempting the same have been reported (reviewed in Morr and Ha, 1993, *CRC Critical Rev. Food Sci. Nutr.* 33:431-476.)

It was discovered over a decade ago (Hwang and Damodaran, 1995, *J. Agric. Food Chem.* 43: 33-37, U.S. Pat. No. 5,436,014) that chitosan is very efficient at binding residual lipids, forming a large chitosan (chitosan-lipid) complex. Chitosan is a polyglucosamine polymer derived from chitin, typically found in crustacean shells. The pK of the polyglucosamine residue is about 6.3. Thus, chitosan is polycationic (positively charge polymeric molecule) in acidic pH, and it forms complexes with phospholipids and phospholipoproteins. In the work of Damodaran this chitosan complex was removed by centrifugation. Even though chitosan complexing of lipids has been recognized for over a decade, this process has not been utilized by the dairy industry. Concerns were raised about the delicate nature of the chitosan-lipid complexes which could be damaged during entry to the centrifuge, and special centrifuges may be needed that are not always common in the dairy industry. Continuous filtration systems were not used previously in this chitosan complex removal process since the complex would rapidly foul the membrane and the pumping used to create the cross-flow velocity in this filtration method would destroy the complex. In U.S. Pat. No. 5,436,014 filtration was disclosed in the context of the use of a filter press (batch filter), and microfiltration was not utilized. It was believed that microfiltration would not work due to plugging of the membrane by the chitosan-lipid complex.

It would be advantageous to reduce variability in both flavor and functionality and produce WPC compositions that have enhanced clarity for beverage applications, less off-flavors for nutritional fortification purposes and enhanced foaming and emulsification properties. In clear beverage applications WPI are currently being used due to the high turbidity of existing WPC80; a clear WPC80 would provide a lower cost alternative to WPI for clear beverage applications as long as the WPC80 can closely match the clarity and not have off-flavors which are major benefits of WPI. This will increase the use of WPC in these products and help it compete with other cheaper proteins sources such as soy which are making improvements in their flavor attributes. The present invention addresses these and related needs.

BRIEF SUMMARY

Methods of removing lipid from protein and lipid-containing materials are provided. The methods include the steps of adding a sufficient amount of chitosan to the protein and lipid-containing materials to form a chitosan-lipid complex in solution; adjusting the solution to a pH of about 4.0 to 5.0; mixing the solution for a sufficient time to form a precipitate of the chitosan-lipid complex; and separating the chitosan-lipid complex from the solution using microfiltration to form a substantially lipid-free protein permeate. The substantially lipid-free protein permeate may be lactose-enriched and it may be spray-dried. The light absorption of a 5% aqueous solution of the substantially lipid-free protein permeate powder, measured at 500 nm, may be less than 0.06 relative absorbance units. The microfiltration may be performed with a microfiltration membrane that has a pore size of between about 0.05 μm to about 5.0 μm, and preferably between about 0.1 μm to about 1.0 μm. In some embodiments, the microfiltration is performed with a microfiltration membrane that has a pore size of about 0.3 μm. The microfiltration may be performed with a spiral-wound microfiltration membrane. The microfiltration may be performed at a temperature of between 10° C. and 55° C., and preferably at a temperature of between 15° C. and 45° C. In the practice of the methods, the protein and lipid-containing material may be whey.

Processes for preparing compositions from whey are provided. The processes include: adding a sufficient amount of chitosan to the whey to form a chitosan-lipid complex in solution; adjusting the solution to a pH of about 4.0 to 5.0; mixing the solution for a sufficient time to form a precipitate of the chitosan-lipid complex; and microfiltering the solution to separate the chitosan-lipid complex from the solution to form a substantially lipid-free whey protein permeate. The protein permeate may be lactose-enriched. The light absorption of a 5% aqueous solution of the protein permeate powder, measured at 500 nm, is preferably less than 0.06 relative absorbance units. In the practice of the methods of the present invention, the whey may be clarified prior to adding chitosan. The microfiltration may be performed with a microfiltration membrane that has a pore size of between about 0.05 μm to about 5.0 μm, and preferably between 0.1 μm to about 1.0 μm. The microfiltration may be performed with a spiral-wound microfiltration membrane. The microfiltration may be performed at a temperature of between 10° C. and 55° C., and preferably at a temperature of between 15° C. and 45° C.

Whey protein concentrate compositions are provided, which include about 34-89 wt % protein, and less than 1% fat. The whey protein concentrate compositions may preferably include about 75-85 wt % protein. The light absorption of a 5% aqueous solution of the compositions, measured at 500 nm, is less than 0.06 relative absorbance units. The compositions are preferably substantially chitosan-free. The compositions may have more than 10% lactose. The light absorption of a 5% aqueous solution measured of the compositions, at 500 nm, may be less than 0.06 relative absorbance units after the composition has been in storage for 6-12 months at about 20° C. or lower temperatures. The compositions of the present invention may be obtained using the methods and/or processes described herein.

DETAILED DESCRIPTION OF THE PRESENTLY PREFERRED EMBODIMENTS

Figure 1:
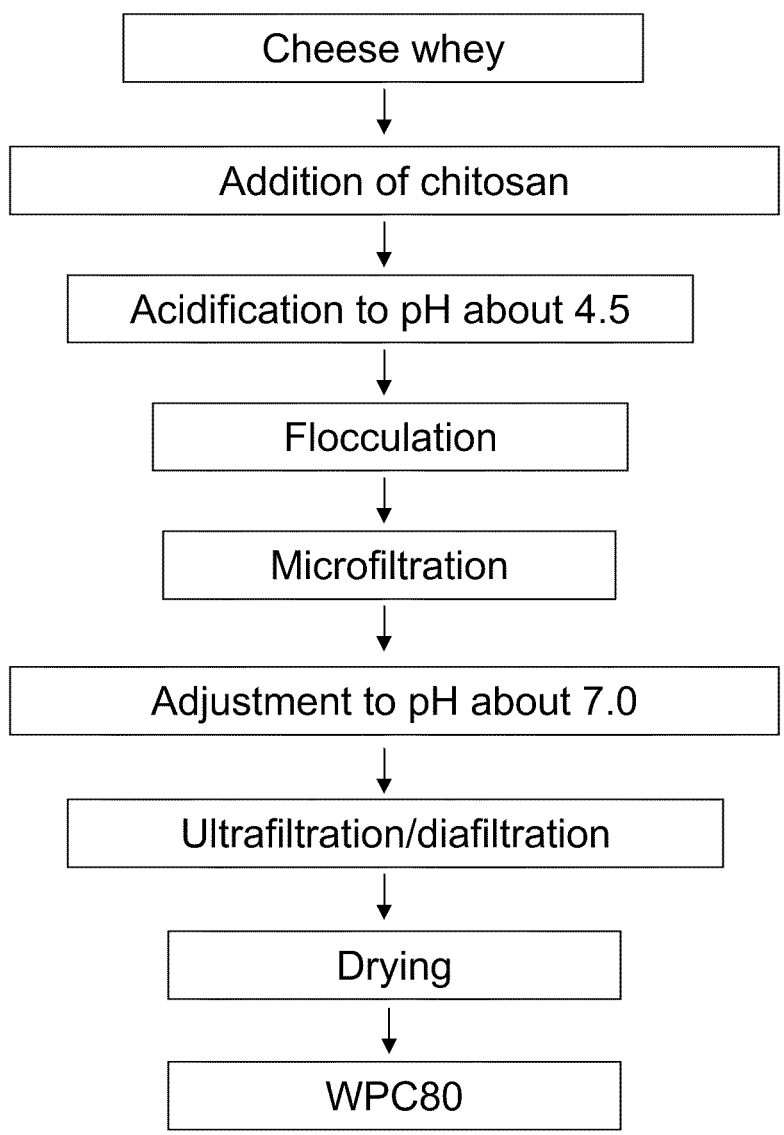
FIG. 1 is a schematic diagram of one embodiment of the process for the production of low fat, clear whey protein concentrate according to the present invention.

It is to be understood that this invention is not limited to the particular methodology, protocols, subjects, or reagents described, and as such may vary. It is also to be understood that the terminology used herein is for the purpose of describing particular embodiments only, and is not intended to limit the scope of the present invention, which is limited only by the claims.

The present invention relates to a new process for isolating whey protein concentrate (WPC) and the products made by this process. The new process includes the steps of generating chitosan-lipid complexes in whey solution, and using microfiltration to separate the formed chitosan-lipid complexes, thus obtaining substantially lipid-free whey protein permeate with enhanced clarity. Various aspects of the present invention are disclosed in Jarto, 2009, M.S. Thesis, University of Wisconsin-Madison, which is herein incorporated by reference.

"Whey" is the watery part of milk that is separated from the coagulable part or curd, especially in the process of making cheese. Whey is typically rich in lactose, minerals, and vitamins and contains α-lactalbumin, β-lactoglobulin and traces of fat. Whey is also defined as those proteins that remain in milk serum after coagulation of the caseins at pH 4.6 and 20° C. (Morr and Ha, 1993). An example of whey suitable for practicing the present invention is fresh separated colored cheddar cheese whey obtained from the University of Wisconsin-Madison Food Science Dairy Plant. The starting whey may be pre-treated in a variety of ways known in the art. For example, the staring whey may be pasteurized. The whey may also be clarified, e.g. mechanically clarified by centrifugation (as described by for example, Walstra et al. (2005) *Dairy Science and Technology*, Published by Taylor & Francis).

"Whey proteins" are the group of milk proteins that can be isolated from whey. The major whey proteins in cow's milk include beta-lactoglobulin, alpha-lactalbumin, and serum albumin.

"Whey protein concentrate"(WPC) is produced by separating out nonprotein materials (e.g. lactose) from whey. The separation is typically in the form of filtering, and the starting whey is typically pasteurized. Separating out nonproteins from whey results in WPC compositions that are enriched in proteins, which can be used to simultaneously enhance protein fortification and functionality of a food product. For instance, WPC with 75% protein content can sometimes be used as a replacement for egg whites. WPC typically contains 34% or more whey protein, and in general may contain any desired percentage of whey protein, from about 34% to about 89%.

"Whey protein isolate" (WPI) is produced from whey using physical separation techniques (e.g., by adsorption of proteins directly from whey onto ion-exchange beads or alternatively by extensive filtering of milk) that remove sufficient nonprotein constituents from whey so that the finished dry product contains not less than 90% protein. Isolates are processed to remove the fat, and lactose, and they have at least 90% protein by weight.

In the present context, the term "cheese" may be any kind of cheese and includes, e.g., natural cheese, cheese analogues, and processed cheese. The cheese may be obtained by any suitable process known in the art, such as, for example, by enzymatic coagulation of the cheese milk with rennet, or by acidic coagulation of the cheese milk with food grade acid or acid produced by lactic acid bacteria growth.

Milk from different species of animals may be used in the production of WPC according to the present invention. Thus, "milk" may be the lacteal secretion obtained by milking, e.g., cows, sheep, goats, buffaloes or camels.

"Aqueous solution" means a solution in which the solvent is primarily water.

In the present context, the term "filtration" refers to the process of using a filter to separate a mixture. In the dairy industry, filters are typically used in separation and/or fractionation processes, to separate into fractions and to remove molecules from milk, based on size difference.

As used herein, the term "microfiltration" (MF) is used to mean a class of filtration, driven by a pressure gradient, which typically uses membrane pore sizes of about 0.1 to 5.0 µm, preferably of about 0.2 to 0.5 µm, and pressures on the upstream side of the membrane often ranging from 100 to 500 kPa.

As used herein, the term "ultrafiltration" is used to mean a class of filtration, driven by a pressure gradient, which typically has a molecular weight cutoff (MWCO) range from about 3,000 to about 100,000 Da. In milk separation/fractionation processes, ultrafiltration is traditionally used for fractionation of whey proteins from lactose.

As used herein, the term "diafiltration" is used to mean a specialized class of filtration in which the retentate is diluted with solvent (e.g., water) and refiltered, to reduce the concentration of soluble permeate components and increase further the concentration of retained components. Thus, as used herein, the term "microfiltration and diafiltration" (MF/DF) refers to a combined MF and DF separation and/or fractionation step, where MF is performed in combination with DF, i.e., the retentate is diluted with solvent and re-filtered through a MF membrane. Similarly, the term "ultrafiltration and diafiltration" refers to a combined ultrafiltration and diafiltration separation/fractionation step, where ultrafiltration is performed in combination with diafiltration, i.e., the retentate is diluted with solvent and refiltered through an ultrafiltration membrane.

As used herein, the term "permeate" is used to mean, in relation to a filtration process, that liquid product of filtration which contains only those components that are able to pass through the filtration membrane. As used herein, the term "retentate" is used to mean, in relation to a filtration process, that liquid product of filtration which is concentrated and which contains all the components typically found in the original liquid but with an increased solids mass percentage (as compared to the original liquid), for example increased amounts of protein, fat, and minerals (ash).

As used herein, "cross-flow" membrane filtration is used to mean a class of filtration that typically produces two effluent streams, permeate and retentate. Permeate is the purified fluid that has passed through the membrane during the filtration process. The retentate is the remaining fluid that has become enriched with compounds that could not permeate the membrane. Filtration with parallel flow of the feed material on the surface of the membrane that typically produces two effluent streams, permeate and retentate.

As used herein, the term "flocculation" is used to refer to a process of contact and adhesion whereby the particles of a dispersion form larger-size clusters, i.e., the solute comes out of solution in the form of floc or flakes. Flocculation is synonymous with agglomeration and coagulation, and action differs from precipitation in that the solute coming out of solution does so at a concentration generally below its solubility limit in the liquid. In colloid chemistry, the term is used to refer to the process by which fine particulates are caused to clump together into floc. The floc may then float to the top of the liquid, settle to the bottom of the liquid, or can be readily filtered from the liquid.

As used herein, "chitosan" refers to a linear polysaccharide composed of randomly distributed β-(1-4)-linked D-glucosamine (deacetylated unit) and N-acetyl-D-glucosamine (acetylated unit). Commercial chitosan is derived from the shells of shrimp, crab, and other crustaceans, and is typically produced by deacetylation of chitin, which is the structural element in the exoskeleton of crustaceans. The degree of deacetylation (% DA) can be determined by NMR spectroscopy, and the % DA in commercial chitosans is in the range 60-100. Ground, food grade (self-affirmed GRAS) chitosan with 78-92% deacetylation, suitable for practicing the present invention, can be obtained, for example, from Seltzer Chemical, Inc. (Carlsbad, Calif.) and is produced by, for example, Primex (Iceland).

As used herein, the terms "substantially fat-free" or "substantially lipid-free" mean that an amount of the fat (i.e., lipids) has been removed to provide a significant reduction in fat. A significant reduction in fat is a reduction to at least 3 percent (3%) fat (wt/wt of the final product). Such a reduction can be achieved by reducing at least 50 weight percent of the typical amount of fat in final product. For example, while a control WPC80 may have 6 (wt) % fat, a substantially fat-free WPC80 product obtained according to the present composition will have at least 50% reduced amount of fat, i.e. it will have no more than 3 (wt) % fat. It is contemplated that the substantially fat-free WPC80s of the present invention generally have less than 1 (wt) % fat.

As used herein, the term "substantially chitosan-free" means that an amount of the chitosan has been removed to provide a significant reduction in chitosan. A significant reduction in chitosan is a reduction of at least 95 percent (98%) chitosan of the chitosan added (wt/wt), i.e., in the final product there is less than 5% of the added chitosan remaining.

As used herein, the terms "lactose-enriched" or "lactose-enhanced" mean that the amount of lactose in the product has been increased by at least 3 percent (3%) (wt/wt of the final product). Such an increase can be achieved by increasing at least 50 weight percent of the typical amount of lactose in final product, and it may occur due to the lower fat content in the final product. For example, while a control WPC80 may have 6 (wt) % lactose, a lactose-enriched WPC80 product obtained according to the present invention will have at least 50% increased amount of lactose, i.e. it will have at least 9 (wt) % lactose, or more preferably, at least 10 (wt) % lactose.

"Clarity" is the property of being clear or transparent. "Turbidity" is the cloudiness or haziness of a fluid caused by individual particles (suspended solids). Turbidity is inversely correlated to clarity, and is used to indicate in a general sense that a fluid lacks clarity. Relative clarity (and through that relative turbidity) of a fluid can be assayed by measuring light absorbance of a fluid, for example using a spectrophotometer. The relative clarity (and at the same time, relative turbidity) of a WPC solution according to the present invention can be assayed by measuring the light absorbance (at 500 nm) of an aliquot of the WPC solution. The starting WPC solution can be diluted as necessary to perform light absorbance measurements. The WPC compositions of the present invention generally have increased clarity, i.e. decreased turbidity, over comparable control WPCs (i.e. WPCs produced without the chitosan pretreatment process, also without microfiltration). As well, the WPC compositions of the present invention generally have increased clarity, i.e. decreased turbidity, over comparable commercially available WPCs that have similar protein contents.

Certain aspects of selective precipitation and removal of lipids from cheese whey using chitosan, useful for practicing the present invention, have been described in Hwang and Damodaran, 1995, *J. Agric. Food Chem.* 43: 33-37, and in U.S. Pat. No. 5,436,014, both of which are incorporated herein by reference.

Figure 11:
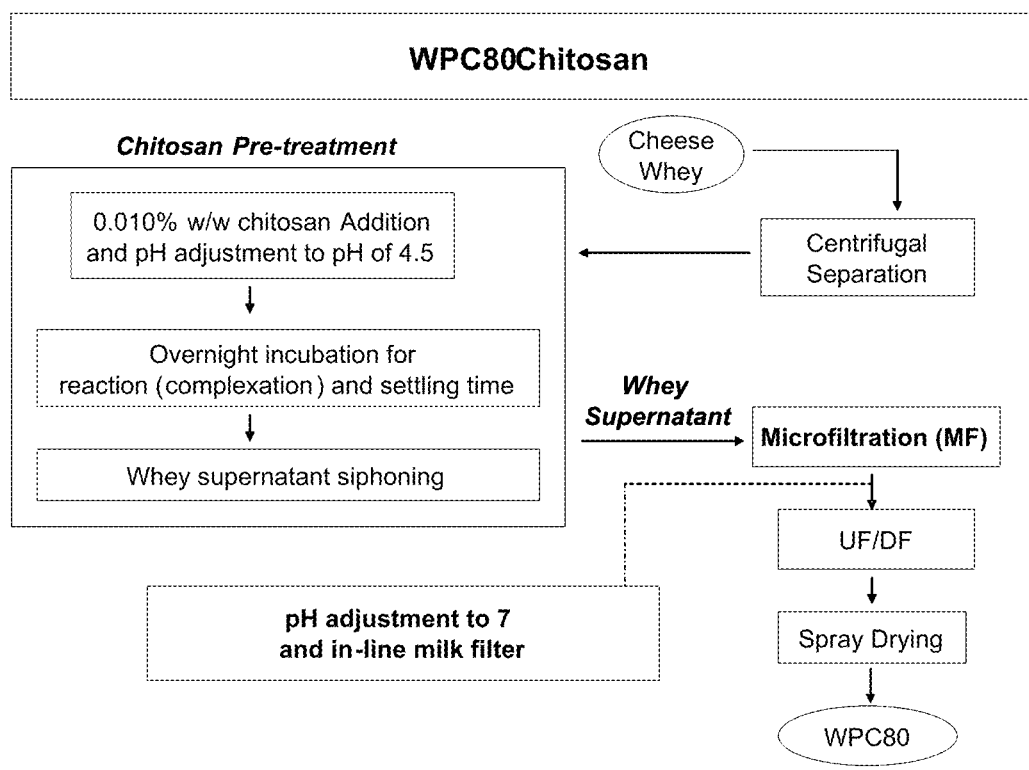
FIG. 11 is a schematic diagram of another embodiment of the process for the production of low fat, clear whey protein concentrate according to the present invention.

In accordance with this invention, it has been discovered that polymeric MF membranes are useful for the fractionation and/or purification of lipids and/or chitosan-lipid complexes from chitosan-treated whey. Accordingly, as shown in FIG. 1, one embodiment of the invention is directed toward a new integrated membrane filtration process for the separation of lipids from whey proteins and fractionation and purification of whey proteins from whey. The product of the microfiltration (MF) process shown in FIG. 1 is the permeate. The product of the ultrafiltration/diafiltration process shown in FIG. 1 is the retentate. In case when pH adjustment has been done prior to chitosan addition (pre-dissolved in acid), then the pH has to be re-adjusted to about 4.5 (e.g. with caustic or by water dilution). Shown in FIG. 11 is another embodiment of the invention directed toward a new integrated membrane filtration process for the separation of lipids from whey proteins and fractionation and purification of whey proteins from whey.

Figure 2:
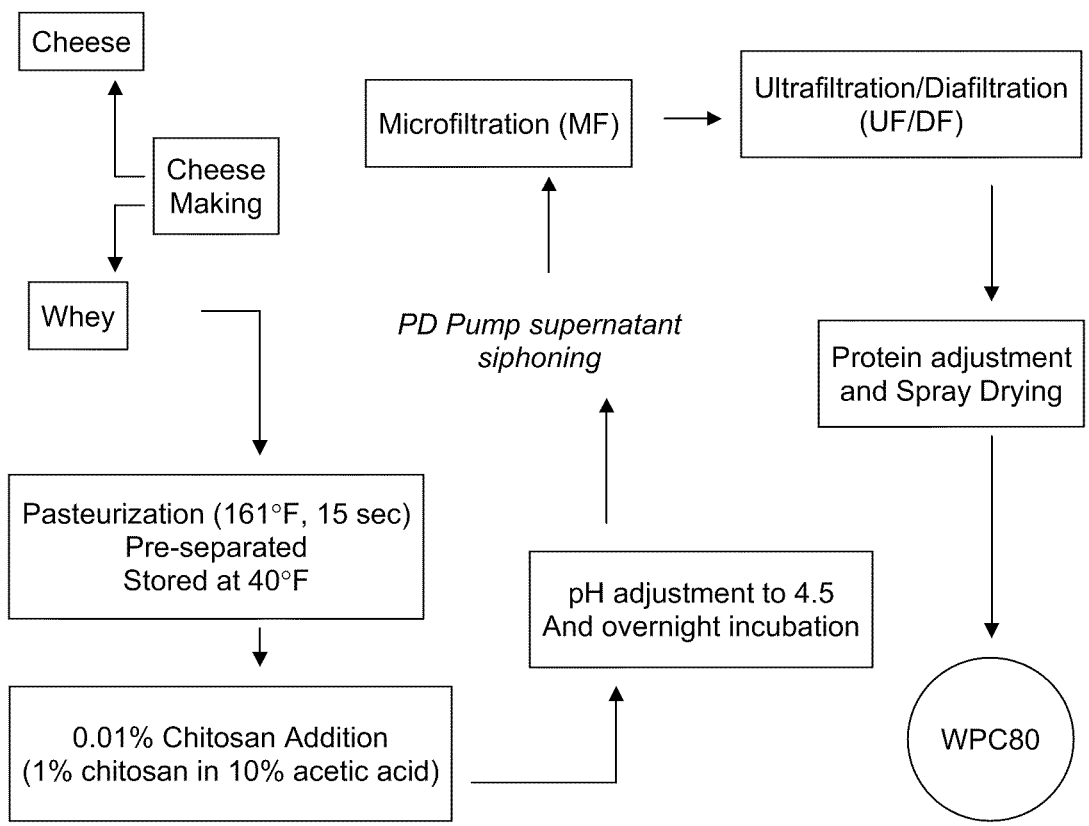
FIG. 2 is a schematic diagram of another embodiment of the process for the production of low fat, clear whey protein concentrate according to the present invention, which includes whey pre-treatment.

As shown in FIG. 2, one embodiment of the invention is directed toward a new integrated membrane filtration process for the separation of lipids from whey proteins and fractionation and purification of whey proteins from whey, which has also been pre-treated.

In one preferred embodiment, separation of the lipids (bound in chitosan-lipid complexes) from whey protein is achieved using polymeric microfiltration membranes made from non-ceramic material. The MF membranes can be made out of various polymers that are used for separations, including, but not limited to, cellulose acetate, polysulfone, polyethersulfone, polyamide, polyvinylidene fluoride (PVDF), charged PVDF nylon, polytetrafluoroethylene (PTFE), polypropylene, regenerated cellulose, or any mixture of the above polymers.

In some preferred embodiments, the pore size of the MF membrane may vary from about 0.05 μm to about 5.0 μm. In other preferred embodiments, the pore size of the MF membrane may vary from about 0.1 μm to about 5.0 μm, corresponding to approximately 10,000 to more than 1,000,000 Da molecular weight cutoff. Preferably the pore size ranges from about 0.2 μm to about 1.0 μm, and very preferably the pore size is about 0.3 μm to about 0.5 μm. For example, polyvinylidene fluoride (PVDF)-based membranes of 0.5 μm nominal pore diameter, useful for practicing the invention, are available from Parker (Oxnard, Calif.) under the name "F-Series Microfiltration Sanitary Spiral Elements".

Various types of MF membrane configurations are possible. Nonlimiting examples of MF membrane configurations include tubular, spiral wound, hollow fiber, flat sheet, plate and frame, or modular configurations.

The transmembrane pressure during MF can range, for example, from 10 kPa to 1,000 kPa. The flow rate of the permeate during MF can range, for example, from 100 $Lm^{-2} h^{-1}$ to 10,000 $Lm^{-2} h^{-1}$.

In all steps that require MF processing in the purification scheme, the same type of membranes and filtration systems can be used. Apart from the new type of polymeric MF membranes, the process outlined in the invention uses equipment that is commonplace in the dairy processing industry.

In some preferred embodiments, the new methods described herein involve the use of polymeric microfiltration (MF) to remove most of the fat from whey. The methods take advantage of some aspects of the chitosan complexation process described in U.S. Pat. No. 5,436,014. For example, the methods may include the steps of adjustment of the acidity of the whey to pH 4.5, addition of about 0.01 (wt) % chitosan (for unconcentrated whey) and room temperature holding, allowing the complex to settle, processing the supernatant from this treated whey using a spiral-wound polymeric microfiltration membrane (0.2 to 0.5 micron), readjustment of the permeate to pH 6-7, the use of an in-line large course filter to remove any residual excess (unbound) chitosan, and then ultrafiltration-diafiltration to produce a WPC80 product that has a very low fat content (≤0.5%) and low turbidity (≤0.08, in a five percent WPC80 solution). In U.S. Pat. No. 5,436,014, the chitosan-lipid complex was removed by centrifugation. However, this process has not been utilized by the dairy industry. Concerns were raised about the delicate nature of the chitosan-lipid complexes which could be damaged during entry to the centrifuge, and special centrifuges may be needed that are not always common in the dairy industry. Continuous filtration systems such as MF were not used previously in this chitosan process since the chitosan-lipid complex would rapidly foul the membrane and the pumping used to create the cross-flow velocity in this filtration method would destroy the complex. Polymeric MF membrane systems were not commercially available when U.S. Pat. No. 5,436,014 was filed.

In some aspects of the invention, novel methods to produce whey that is clear and bland flavored are provided. In some embodiments, polymeric microfiltration is used to remove most of the fat (and specifically the phospholipid) content of whey. This new process greatly reduces variability in both flavor and functionality and produces WPC powders that have enhanced clarity, less off-flavors for nutritional fortification purposes and enhanced foaming properties. The invention is particularly well suited for the production of whey protein concentrate (WPC) products with very little turbidity and greatly reduced fat (for example, less than 1%; less than 0.9%; less than 0.8%; less than 0.7%; less than 0.6%; or less than 0.5% fat) that are similar in clarity to whey protein isolate (WPI) products, which typically have more than 90% protein. Solutions produced using the newly obtained WPC and the solution is clear (not yellow) even when colored whey is used as a starting material. Numerous applications for such WPCs exist, including for clear beverage applications (e.g. protein fortification), extended storage, etc.

In one embodiment, the present invention provides methods for selective precipitation of whey lipids by chitosan and reduction of residual lipids in WPC80 to <1%. Not wanting to be bound by the following theory, it is possible that a reduction in the concentration of residual lipids in WPC80 improves its clarity and flavor by removing small fat globules, phospholipids and color compounds (e.g. Annato), which are prone to oxidation. The methods include the use of relatively low concentration of chitosan (in some embodiments about 0.01% wt/wt for unconcentrated whey), which forms a complex with membrane lipids and color compounds at pH 4.5, and the use of 0.2-0.5 μm (in some embodiments 0.3 μm) polymeric microfiltration (MF) system to remove the chitosan-lipid complex from whey.

The inventors have developed a novel method to effectively remove the undesired chitosan-lipid complex from whey. The final product obtained according to the present invention is low fat or is substantially fat-free (i.e., substantially lipid-free). In addition, the final product obtained according to the present invention is free or substantially free of chitosan. The final product has functional properties that are superior to unprocessed control samples and to other comparable commercially available products. Some comparative advantages of the products obtained according to the present invention include superior functional properties such as solubility, foaming, and pH stability, as well as superior sensory properties (volatiles), color (clarity), and bland flavor. It is contemplated that the lowfat WPC products would also have improved emulsification properties.

Figure 5:
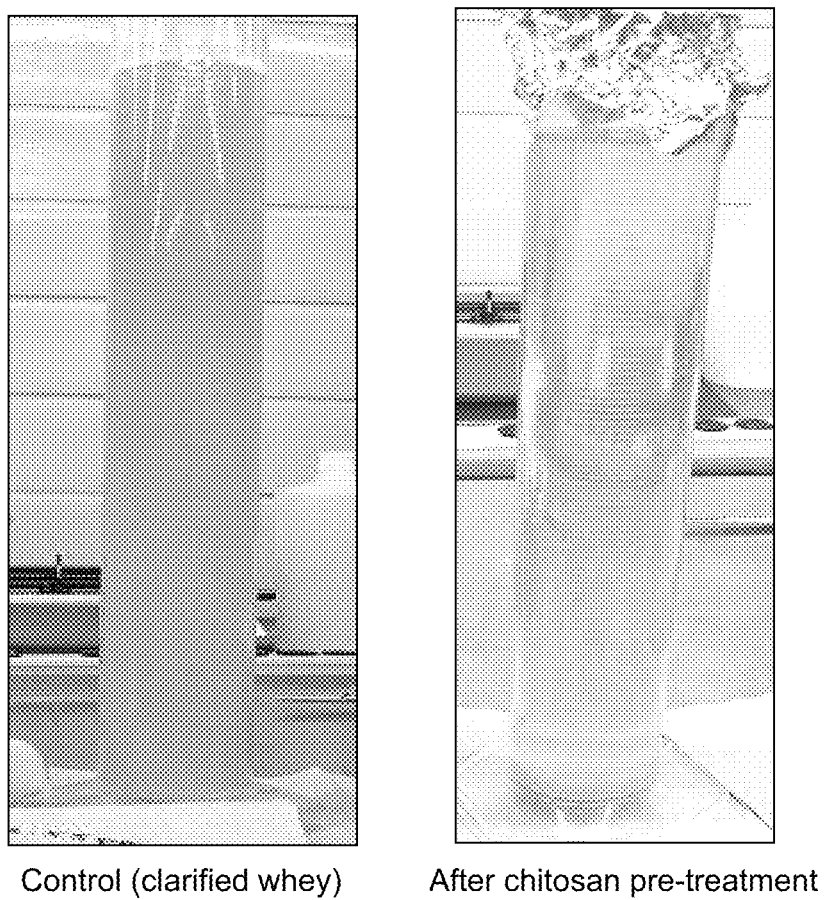
FIG. 5 are images showing the impact of chitosan pretreatment on the clarity of whey prior to microfiltration. Clarified whey without chitosan pretreatment is more turbid.

Schematic diagrams of the process for the production of low fat, clear whey protein concentrate (for example WPC80) according to the present invention is shown in FIGS. 1, 2, and 11. Cheese whey is used as a starting compound. The whey may be pasteurized and/or clarified as desired. In brief, the cheese whey is acidified to a pH of about 4.5. Chitosan is then added to the acidified whey, as the temperature is increased. Pre-dissolved chitosan in acid is then added to the whey and the pH of the mixture is adjusted to pH of 4.5. In some embodiments, final pH adjustment to pH 4.5 can be done prior to or after chitosan addition (e.g. with caustic and acid, respectively). The amount of added chitosan can vary, and can range from about 0.005 (wt) % to about 0.5 (wt) %. In some embodiments (for unconcentrated whey), the relative amount of chitosan used is about 0.015 (wt) %. The temperature of the acidified whey is increased before, during, or after chitosan addition. The temperature is relatively increased to between about 15° C. and 35° C. In some embodiments, the temperature is increased to about room temperature, which can be about 25° C. Flocculation is allowed to take place for a period of time (for example, 30 min) at these temperatures. During this period of time (or longer time, e.g. overnight) the chitosan-lipid complexes are allowed to settle and a clear supernatant is formed (FIG. 5).

Figure 6:
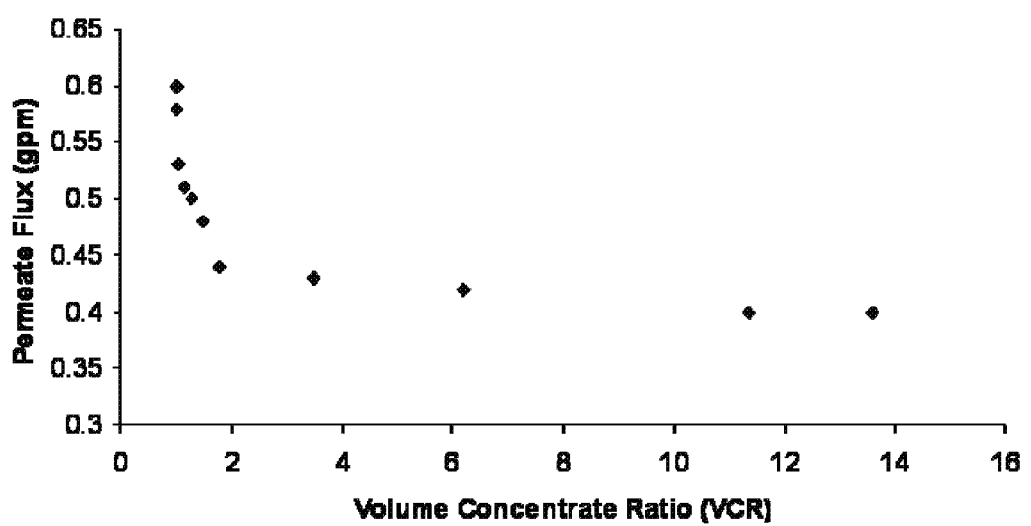
FIG. 6 is a graph showing permeate flux rate during the separation of the chitosan-phospholipid in whey with a 0.3 micron polymeric membrane

The supernatant from the chitosan-treated whey is then microfiltered (for example, using a spiral-wound polymeric microfiltration membrane with 0.2 to 5 μm pore size). The retentate contains the majority of lipids and chitosan. The MF can be operated at around 14 psi (low pressure) and around 25° C., which helps to maintain the complex during filtration. Higher fat contents and higher turbidities are observed if the chitosan complexation process is omitted and the clarified whey is filtered through the polymeric MF system. Excellent membrane performance can be achieved with only a very slow reduction in flux over 4-5 h processing runs for 100 gallons of supernatant (FIG. 6). Thus, in one aspect, this process has the advantage of being able to use MF, which is preferably conducted as a continuous separation method. MF is also a technique that is already used in the dairy industry. The use of ceramic MF for this purpose is less successful as the various pumping equipment/processing required results in damage to the chitosan-lipid complex and allows some of it to permeate the membrane (unless the supernatant is used). The polymeric MF membranes allow reducing and/or regulating flow and backing pressure that could damage the chitosan-lipid complex. Ceramic MF systems that were designed to have an improved pumping system (including methods to better control flow and pressure regulation, such as, frequency drive controlled pumps), could also be suitable. MF has other benefits for WPC80 manufacture including the removal of bacteria (both live and dead) so less bacterial enzymes are used, thereby reducing the off-flavors during storage. MF is a non-thermal pasteurization of whey (each additional heat treatment causes protein aggregation and loss of solubility).

MF has not been applied to the production of WPC80 although it is used for defatting in WPI manufacture. The high fat content of clarified whey without the chitosan treatment results in a turbid whey (FIG. 5) which if directly used for MF without chitosan pretreatment would likely cause a reduction in MF performance due to fouling of the membrane. Chitosan pretreatment of the whey results in a relatively clear starting material (FIG. 5) for filtering which is likely to have a benefit of less fouling of the membranes during processing.

In certain preferred embodiments of the present invention, 0.22 μm membranes are used. In other preferred embodiments of the present invention, 0.3 μm membranes are used. However, useful for the practice of the methods is a variety of microfiltration membranes with smaller pore sizes (for example, 0.01, 0.05, 0.1, 0.2 or 0.22 μm pore size). As well, useful for the practice of the methods is also a variety of microfiltration membranes with larger pore sizes (for example, 0.4, 0.5, 0.6, 0.7, 0.8, 0.9. 1.0 or up to 5 μm pore size), which may be more attractive as flux would be higher and there is less likelihood of protein rejection with larger pore membranes. Chitosan pretreatment of whey could also be applied for WPI manufacture and again larger pore membranes could be used instead of the small pore MF that are often used at present (which result in high protein losses and slower flux).

The acidity of the microfiltered permeate is adjusted to a pH with a value of between about 6.0 and 7.0. An in-line large course filter (pore size>10 μm) can optionally be used to remove any residual excess (unbound) chitosan. The microfiltered permeate is then subjected to ultrafiltration-diafiltration to produce an ultrafiltered permeate, and a WPC (e.g. WPC80) product that has a relatively very low fat content (≤0.5%) and relatively low turbidity (e.g., ≤0.08 relative absorbance units at 500 nm—$A_{500}$, in a 5% solution of WPC80). Higher fat contents and higher turbidities are observed if the chitosan complexation process is omitted and the clarified whey is filtered through the polymeric MF system.

In one example, a preferred embodiment of the method for producing WPC includes the following steps: 1) obtaining cheese whey; 2) clarification/separation; 3) chitosan pre-treatment; 4) microfiltration; 5) ultrafiltration/diafiltration; 6) spray drying; 7) obtaining WPC. For comparison, WPC with inferior characteristics can be obtained through a process that includes the following steps: 1) obtaining cheese whey; 2) clarification/separation; 3) microfiltration; 4) ultrafiltration/diafiltration; 5) spray drying; 6) obtaining WPC. Also for comparison as a control, WPC with inferior characteristics can be obtained through a process that includes the following steps: 1) obtaining cheese whey; 2) separation; 3) ultrafiltration/diafiltration; 4) spray drying; 5) obtaining WPC.

The WPC of the present invention may be used in a variety of processed whey protein products. For example, 80% WPC may be used in food products as a rich source of high quality protein; may be used in nutritional beverages, food bars, supplements, infant foods, processed cheese, meat or fish products; and may also be used as a protein source for feed rations. 34% WPC may be used in food products as a partial nonfat milk replacer or to improve texture of low fat items; in nutritional beverages, nutritional food bars, nutritional supplements, infant foods, yogurts, processed cheese, sausage products and many other diverse applications; and can also be used as a protein source for feed rations.

Figure 7:
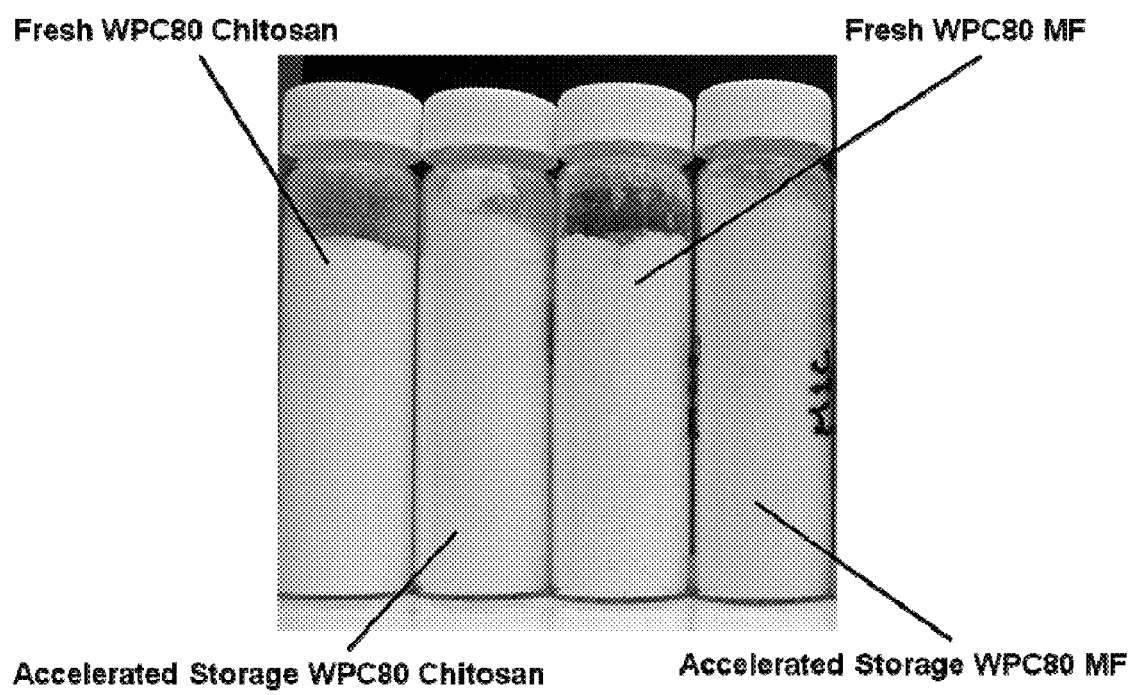
FIG. 7 is an image showing the impact of accelerated storage of WPC powders (60° C. for 4 days) on color development.

In some embodiments of the present invention, provided are whey compositions that are relatively less sensitive to browning. As illustrated in FIG. 7, the whey powders made from this novel process have better browning resistance in comparison to whey powders that are obtained using conventional methods). Formation of brown/yellow colors during storage of whey powders is a major factor limiting their use. Most color formation is likely due to Maillard reaction between lysine groups of proteins/peptides and reducing groups of lactose. Another possible route is aldehyde formation from lipid oxidation and these aldehydes may also be involved in Maillard browning reactions. Thus, removal of lipids could help prevent browning of whey powders. This is an unexpected discovery from this chitosan-treated whey. Therefore, this process could be used to prevent/reduce browning in various whey powders, such as sweet whey and various types of WPC.

EXAMPLES

The following examples are offered to illustrate, but not to limit the claimed invention.

Example 1

Materials and Methods

Various wheys were obtained from the Dairy Plant at the University of Wisconsin-Madison. These wheys included Cheddar, Monterey Jack, Swiss and Gouda. The details of the chitosan process used were as follows: chitosan treatment included the use of chitosan, a cationic polysaccharide, to selectively bind PL in the whey by electrostatic interaction and forms an insoluble precipitate. Chitosan has recently been confirmed as a GRAS (self-affirmed) food ingredient. The details of the chitosan treatment are described in Hwang and Damodaran, 1995, *J. Agric. Food Chem.* 43: 33-37 (and U.S. Pat. No. 5,436,014), and include: fresh pre-separated cheese whey (~22-25° C.); pH adjustment to ~4.5 by either acetic acid or concentrated HCl; addition of chitosan to concentration of 0.01~0.02% (wt/wt); stirring for 10 min and incubating for 20 min; and centrifugation at 15-20° C. to collect supernatant. In an example, some samples were additionally subjected to microfiltration (MF), and the permeate was collected in pilot scale work; pH adjustment to 7.0 with NaOH; ultrafiltration/diafiltration of the supernatant; spray dried to yield a whey protein powder with low lipid content.

pH adjustment to pH of 4.5 is typically performed after addition of chitosan. However, if pH adjustment to pH of 4.5 is to be performed prior to chitosan addition, another pH adjustment step after addition of chitosan may be required to maintain pH of 4.5.

In pilot scale trials, the stirring was typically performed during chitosan addition and pH adjustment. The stirring was then stopped and the mixture was allowed to incubate for 30 minutes to 60 minutes (initial trials) and overnight (final trials with supernatant siphoning).

In laboratory scale trials, after chitosan addition, the mixture was then slowly agitated by using vortex mixer at low speed setting of 1 for 15-30 sec, ensuring homogenous mixtures. The pH was immediately adjusted to pH 4.5 by using solutions of 1 M hydrochloric acid or 1 M sodium hydroxide and agitated by using vortex mixer at low speed setting. The samples were then incubated in a water bath at temperature of 25° C. for 20-30 min, allowing the complexes to flocculate.

In initial trials, the microfiltration (MF) unit of the Wisconsin Center for Dairy Research (University of Wisconsin-Madison) that was used for pilot-scale trials was equipped with a ceramic membrane that has a 0.22 micron pore size. Three membrane units were used, each with a surface area per membrane of 2.2 ft$^2$ (0.204 m$^2$) so the total membrane surface area was 6.6 ft$^2$ (0.613 m$^2$).

Different concentrations (0.005 to 0.03%) of chitosan were tested for the efficiency of phospholipid (PL) removal. Bench-top experiments were performed where separation of the PL-chitosan aggregates and the serum was done through centrifugation at 1116×g for 10 minutes. Turbidity measurements (500 nm) were used to indicate removal of PL. Laboratory scale and dairy plant scale experiments were conducted to determine the effect of temperature (15, 25, 35, and 45° C.) towards the separation of the PL-chitosan complex. This information is useful in predicting the effect of microfiltration processing temperature on the quality of the whey permeates and thus, the optimum processing temperature range can be determined. The chitosan treatment procedure was modified by incubating the whey samples at different temperatures and analyzing the turbidity of the final supernatant. These final turbidity values would indicate the degree of complexation efficiency at different operating temperature changes. Clarified whey separated by a commercial clarifier in the dairy plant and whey separated using a laboratory centrifuge were compared.

Figure 3:
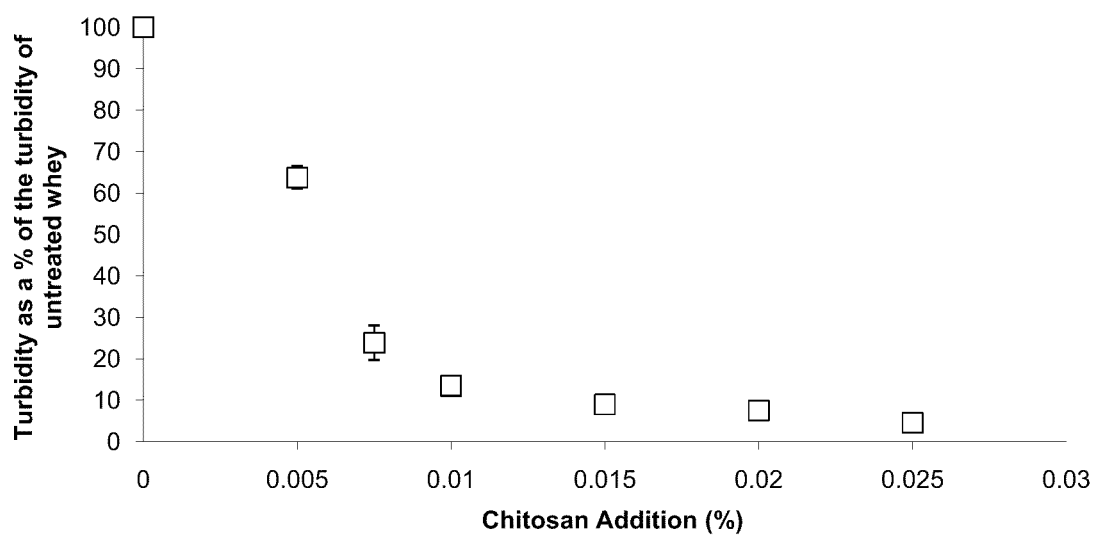
FIG. 3 is a graph showing the impact of the use of various concentrations of chitosan on the reduction in turbidity of pre-clarified Monterey Jack cheese whey.
Figure 4:
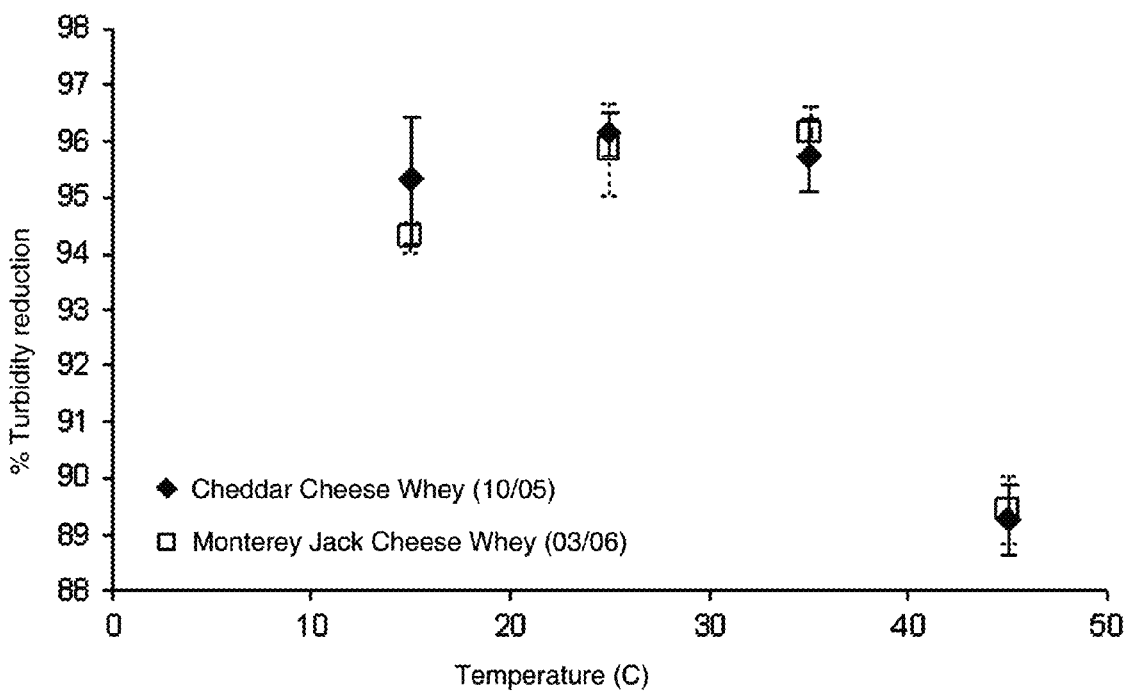
FIG. 4 is a graph showing the impact of incubation temperature on the turbidity reduction efficiency of the chitosan-PL process (various trials using two different types of wheys)

FIG. 4 shows the impact of incubation temperature on the turbidity reduction efficiency of the chitosan-PL process (various trials using two different types of wheys). The experiment was performed in a fashion similar to what was described above in FIG. 3, only dairy plant pre-separated Monterey Jack cheese whey and pre-separated Cheddar cheese whey were used.

In initial pilot scale trial, ceramic MF with back-pulsing feature was also used. Operating conditions were as follows: temperature: 72-80° F., i.e., 22.2° C.-26.7° C. (target temperature: 77° F., i.e., 25° C.), inlet pressure: 27.5-28.5 psi, i.e., 2.79-2.89 MPa (target pressure: 28 psi, i.e., 2.84 MPa). Both clarified and unclarified whey were tested and the types of wheys used were from Cheddar and Swiss cheese.

Results.

Initial work involved testing the procedure for chitosan treatment of whey on many different types of whey. This was performed to help select the level of chitosan needed for reduce turbidity of whey by ≥90%. This work was done at bench top scale with centrifugation to remove the precipitate. Work was also done on using the pilot scale ceramic MF system to remove the chitosan-PL complex. Trials were performed to understand the impact of process variables such as back pulsing frequency and strength, temperature, stirring or mixing used for handling the precipitate. Variables measured included flux rate during processing, turbidity change as a result of the chitosan treatment, and samples were also stored to analyze the fat and phospholipids content of the wheys.

When unclarified whey were treated with chitosan and separated by MF, the turbidity decreased by >99%, whereas without the addition of chitosan, the MF alone reduced turbidity by ~96%. This suggested that the use of the chitosan is useful in helping to remove more residual lipids. A chitosan level of 0.015% was sufficient to decrease turbidity by >90% for different types of cheese whey.

FIG. 3 shows the impact of the use of various concentrations of chitosan on the reduction in turbidity of whey (in this example Monterey Jack cheese whey was used) after removal of the chitosan-PL (chitosan-phospholipid) complex by centrifugation (lab-scale method). In MF trials with unclarified whey chitosan addition was not optimal because, most of chitosan probably was bound to the whey cream (free lipid) instead of the residual PL.

Whey clarified by centrifugation in the lab had lower turbidity than the whey clarified in the dairy plant with a commercial separator. The experiments were done by giving additional incubation time (30 minutes) to the samples after 25° C.-30 minutes complexation step. This additional incubation time were done at 4 different processing temperatures (namely 15, 25, 35, and 45° C.) to investigate the effect of the processing temperature in the microfiltration system on the complex. For clarified whey from the dairy plant, increasing the processing temperature improved the separation of chitosan-PL but temperature had little impact on lab clarified whey. The dairy plant clarified whey contain higher amount of lipid and the unstable emulsion of these lipids at higher temperature might responsible for the improvement of clarity with increasing temperature.

Impact of Various Inlet Pressures.

The impact of different operating inlet pressures on the performance of the separation process (ceramic MF) was investigated, in order to optimize the operating inlet pressure. The separation profile became better as the inlet pressure lowered. However, the trend of the % turbidity removal profile suggested that the separation would break down as the process went to higher weight concentration factors (WCF). This was also seen from the decreasing then increasing permeate flux profile of the ceramic microfilter which was accompanied by the rapid declining of the % turbidity removal.

These observations suggested that under certain conditions the chitosan-residual lipids complexes/flocculates/aggregates were being broken down by the ceramic microfiltration system over the processing time. Not wanting to be bound by the following theory, this might be caused by the design of the process to be a batch process with high processing time. This type of design (pressures/flows) would then cause the material (whey and chitosan-residual lipids complex) that will be processed by the microfiltration system to be agitated severely and repeatedly over a long run. To illustrate, note that in one example the feed volume is only about 75-100 gallons while flow rate of the material passing through the microfilter is about 25-33 gallons per minute and the processing time usually takes about 5-6 hours. Therefore, optimization of the inlet pressure may be required for optimal processing results. In addition, the ceramic MF system has numerous pumps and high shear that likely damaged the delicate floc.

Analysis.

Compositional analysis was performed. The amount of moisture was detected by oven drying the samples. The amount of protein detection was performed using the Kjeldahl method (6.38 conversion factor). The amount of fat was determined using the Mojonnier method. Ashing was detected using a 550° C. electric muffle furnace. Minerals were detected using ICP-AES. Turbidity analysis was performed using spectrophotometry. Volatile analysis was performed using Solid Phase Micro Extraction (SPME) and Gas Chromatography-Mass Spectrometry (GC-MS).

Polymeric MF Processing Equipment.

Microfiltration was also performed using a single spiral wound polymeric element with single pump. The membrane pore size was 0.3 μm, with a 9.7 cm diameter, with 0.965 m length, and with surface area per membrane of 5.7 m² and 1.1 mm spacers.

Ultrafiltration was performed using two spiral wound elements in series with single pump. The membrane cut-off was 10,000 Da, with a 9.7 cm diameter, with 0.965 m length, and with surface area per membrane of 5.7 m² and 1.1 mm spacers.

Composition of WPC80.

Representative data of the WPC80 composition obtained according to the present invention (two samples—WPC80 Chitosan-1 and WPC80 Chitosan-2) are shown in Table 1.

Control-1 and Control-2 were WPC80 made from separated colored Cheddar cheese whey without any pre-treatment; MF-1 and MF-2 were WPC80 made by pre-treating separated colored Cheddar cheese whey with 0.30 μm spiral-wound PVDF MF, without chitosan addition; Chitosan-1 and Chitosan-2 were WPC80 made by pre-treating separated colored Cheddar cheese whey with 0.010% w/w chitosan and separating the whey supernatant with 0.30 μm spiral-wound PVDF MF. Numberings (i.e., 1 and 2) indicated production of WPC80 on different dates. Commercial was commercial WPC80.

TABLE 1

Comparative advantages of the composition of WPC80 obtained according to present invention (using polymeric MF)

| WPC80 | (%) | | | | | mg/100 g sample | |
|---|---|---|---|---|---|---|---|
|  | Protein | Fat | Moisture | Ash | Lactose | Ca | P |
| Control-1 | 81.8 | 7.5 | 4.2 | 2.7 | 3.8 | 638 | 362 |
| Control-2 | 79.8 | 5.6 | 6.0 | 2.7 | 5.8 | 622 | 354 |
| MF-1 | 78.2 | 0.5 | 6.8 | 2.9 | 11.7 | 788 | 317 |
| MF-2 | 82.9 | 0.5 | 5.5 | 2.6 | 8.5 | 789 | 275 |
| WPC80 Chitosan-1 | 77.7 | 0.5 | 6.1 | 3.0 | 12.7 | 873 | 386 |
| WPC80 Chitosan-2 | 78.0 | 0.4 | 6.1 | 2.8 | 12.8 | 935 | 404 |
| Commercial | 76.7 | 4.7 | 5.7 | 2.8 | 10.1 | 477 | 398 |

Clarity of the Obtained WPC.

The clarity of the obtained products was tested and compared to the clarity of comparable commercially available products, and the WPC obtained using the methods of the present invention was found to have relatively increased clarity, and conversely, decreased turbidity. For clarity measurement, light absorbance measurements at 500 nm were performed. Powdered WPC80 samples were reconstituted and diluted such that 5% aqueous solutions were obtained. The light absorbance at 500 nm of aliquots of the 5% aqueous solutions were then measured using a spectrophotometer. Representative data are shown in Table 2. The light absorbance of a 5% aqueous solution of WPC80 obtained using chitosan selective precipitation whey pre-treatment (WPC80 chitosan) of the present invention was approximately 0.05 (arbitrary units); the light absorbance of a 5% aqueous solution of microfiltered (but not chitosan-treated) WPC (WPC80 MF) was approximately 0.08 (arbitrary units); the light absorbance of a 5% aqueous solution of control (not microfiltered and not chitosan-treated) WPC (WPC80 Control) was approximately 2.61 (arbitrary units); the light absorbance of a 5% aqueous solution of commercially available WPC ((WPC80 Commercial) was approximately 2.69 (arbitrary units); and the light absorbance of a 5% aqueous solution of commercially available WPI (WPI Commercial) was approximately 0.08 (arbitrary units).

TABLE 2

Relative clarity of composition of WPC80 (WPC80 Chitosan) obtained according to present invention (using polymeric MF)

| Samples at 5% concentration | Absorbance at 500 nm |
|---|---|
| WPC80 Chitosan | 0.05 ± 0.01 |
| WPC80 MF | 0.08 ± 0.01 |
| WPC80 Control | 2.61 ± 0.20 |
| WPC80 Commercial | 2.91 ± 0.10 |
| WPI Commercial | 0.08 ± 0.02 |

TABLE 3

Absorbance values at 500 nm of WPC80 rehydrated at 5% solids

| WPC80 | Absorbance at 500 nm |
|---|---|
| Control | 2.610 ± 0.071[a] |
| MF | 0.085 ± 0.007[b] |
| Chitosan | 0.048 ± 0.004[b] |

Table 3 shows absorbance values at 500 nm of WPC80 rehydrated at 5% solids. Values shown were averages and standard deviations of two samples of the same pre-treatment (i.e. WPC80 Chitosan 1 and WPC80 Chitosan 2). Numbers containing the same superscript were not significantly different (P>0.05). For comparison, 5% solids commercial WPC80 and commercial WPI solutions possessed absorbance values of 0.075±0.005 and 2.914±0.060.

Acid Stability Test.

Table 4 shows absorbance values at 610 nm of WPC80 Control, WPC80 MF, and WPC80 Chitosan solution (3% solids) measured prior to treatments, after pH adjustment to 4.0 and overnight incubation at 4° C., and after pH adjustment to 4.0 that was followed by heat treatment (80° C. for 15 min) and overnight incubation at 4° C. Values shown were averages and standard deviations of two samples of the same pre-treatment (i.e. WPC80 Chitosan 1 and WPC80 Chitosan 2). Statistical analysis was conducted comparing all samples. Comparing all values, numbers containing the same superscript were not significantly different (P>0.05).

In separate experiments, there were two pH treatments: pH of 4 and pH of 3.4, with and without heat.

TABLE 4

Absorbance values at 610 nm of WPC80 Control, WPC80 MF, and WPC80 Chitosan solution

| | Absorbance at 610 nm | | |
|---|---|---|---|
| WPC80 | Untreated | pH = 4 | pH = 4 and Heat |
| Control | 2.66 ± 1.97$^{ab}$ | 14.15 ± 2.46$^c$ | 27.62 ± 1.50$^f$ |
| MF | 0.02 ± 0.01$^a$ | 5.05 ± 0.81$^b$ | 22.38 ± 2.63$^d$ |
| Chitosan | 0.00 ± 0.00$^a$ | 1.90 ± 0.67$^{ab}$ | 22.95 ± 0.80$^d$ |

Analysis of Volatiles.

To analyze the concentration of some undesired volatiles, accelerated storage was performed from these novel WPC80 compositions made with polymeric MF. Samples were preserved in 40 ml vials with Teflon caps. Samples were incubated at 60° C. for 4 days. SPME and GC-MS analysis was then performed. The SPME fiber used was 1 cm fiber of DVB/PDMS/Carboxen.

Sample treatment was performed as follows: 10% protein solution was used. The solution was incubated for 10 minutes at 40° C., 1150 rpm. It was followed by 30 minutes SMPE exposure at 40° C., 1150 rpm. A Restek Rtx-5MS capillary column was used for GS-MS analysis. The GC-MS operating conditions were as follows: 40° C. for 6 minutes, followed by 3° C./min until 200° C., and then by 200° C. for 6 minutes.

Figure 8:
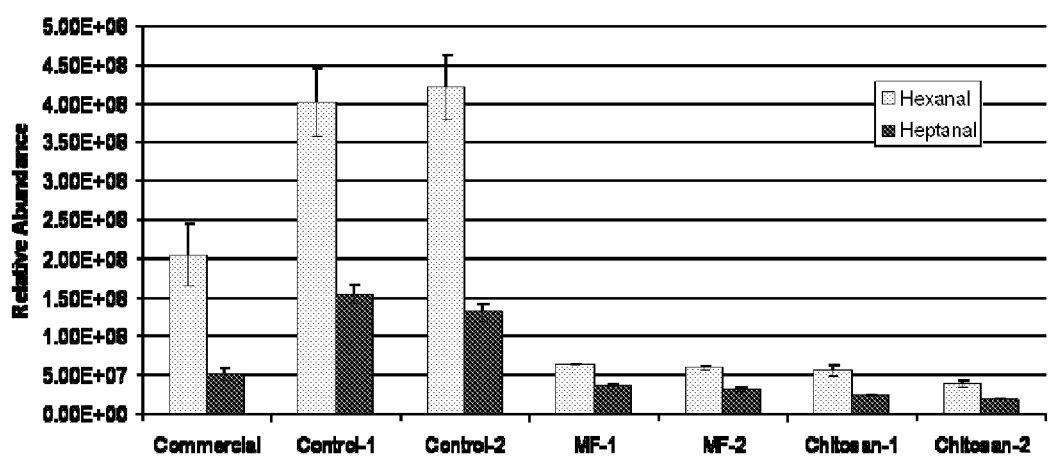
FIG. 8 is a graph showing results from GC-MS analysis of aldehydes on accelerated storage samples.
Figure 9:
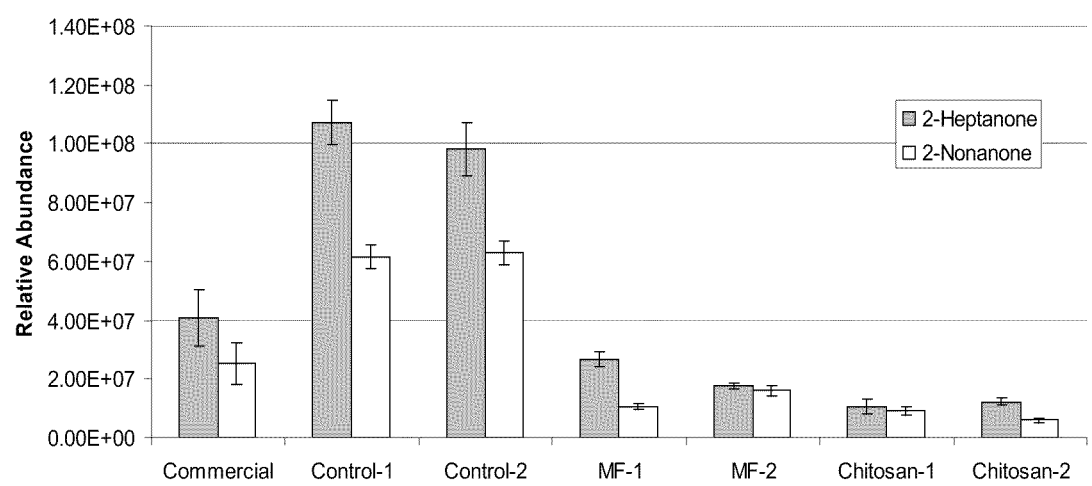
FIG. 9 is a graph showing results from GC-MS analysis of ketones on accelerated storage samples.

Shown in FIG. 8 are data from the analysis of aldehydes in various WPC samples. Shown in FIG. 9 are data from the analysis of ketones in various samples. The two tested WPC80 products obtained according to the present invention (labeled Chitosan-1 and Chitosan-20 had relatively low levels of hexanal and heptanal (FIG. 8), and 2-heptanone and 2-nonanone (FIG. 9) in comparison to the control samples, to microfiltered (MF) only samples, and to commercially obtained samples.

Table 5 illustrates a comparison of the relative abundance (×10$^7$) of the oxidation volatile compounds in the accelerated storage lot. Values shown were averages and standard deviations of two samples of the same pre-treatment (i.e. WPC80 MF 1 and WPC80 MF 2). Statistical analysis was conducted comparing samples within a column (i.e. hexanal column). Numbers containing the same superscript are not significantly different (P>0.05).

TABLE 5

Comparison of the relative abundance (×10$^7$) of the oxidation volatile compounds in the accelerated storage lot

| | Relative abundance (×10$^7$) | |
|---|---|---|
| WPC80 | Hexanal | Heptanal |
| Control | 41.06 ± 1.39$^a$ | 14.22 ± 1.59$^a$ |
| MF | 6.10 ± 0.29$^b$ | 3.35 ± 0.34$^b$ |
| Chitosan | 4.68 ± 1.19$^b$ | 2.07 ± 0.35$^b$ |

| | Relative abundance (×10$^7$) | |
|---|---|---|
| WPC80 | 2-Heptanone | 2-Nonanone |
| Control | 10.27 ± 0.66$^a$ | 6.23 ± 0.11$^a$ |
| MF | 2.21 ± 0.66$^b$ | 1.32 ± 0.38$^b$ |
| Chitosan | 1.15 ± 0.11$^b$ | 0.75 ± 0.24$^b$ |

Foaming properties. The obtained WPC makes a relatively clear solution which is useful for its functionality, for example it has superior foaming properties. The foaming stability was evaluated by monitoring the foam drainage at ambient temperature. Using the same foam generated in the overrun test, the foam was gently transferred into a pre-weighed empty plastic funnel. The stability of the foam was measured based on the elapsed time required to reach 50% of the initial weight of the foam in the funnel. The bottom of the funnel was sealed with parafilm. Small spatula was used and small scoops of the foam were transferred, avoiding entrapped air pockets during transfer. The excess foam was scraped off the top of the funnel using metal spatula, leveling the top of the foam with the top of the funnel. The weight of the foam was recorded and the funnel was then set on a ring stand. The parafilm was removed and the elapsed time was recorded using a stop watch. The draining liquid was collected in a container on a balance. The weight of the draining liquid was continuously monitored and the elapsed time to reach 50% drainage was recorded. The 50% drainage was achieved when the weight of the draining liquid reached 50% of the initial foam weight retained in the funnel. The time to attain 50% drainage was used as foam stability index (Halling, 1981, *CRC Critical Reviews in Food Science and Nutrition* 15: 155-203).

Table 6 shows the foam capacity and stability of WPC80 Control, WPC80 MF, and WPC80 Chitosan. Values shown were averages and standard deviations of two samples of the same pre-treatment (i.e. WPC80 Chitosan 1 and WPC80 Chitosan 2). Statistical analysis was done for each column. Numbers containing the same superscript within a column were not significantly different (P>0.05)

TABLE 6

Foam capacity and stability of WPC80 Control, WPC80 MF, and WPC80 Chitosan

| WPC80 | Foam Overrun (%) | Foam Stability (min) |
|---|---|---|
| Control | 0.0 ± 0.0$^a$ | 0.0 ± 0.0$^a$ |
| MF | 95.8 ± 0.6$^b$ | 26.3 ± 5.4$^b$ |
| Chitosan | 96.4 ± 0.1$^b$ | 29.3 ± 2.0$^b$ |

Shown in Table 7 are comparative foaming data for two samples of WPC80 obtained according to the present invention (WPC80 chitosan); one sample of commercially available WPC80; and two control solutions consisting of no chitosan pretreatment and no MF. The WPC80 chitosan samples produced more foam overrun and this foam was more stable than the commercially available WPC80 or the control solutions. These data further demonstrate that the obtained WPC can be used to replace or substitute commercially available WPC in various applications, including food and food processing and it indicates that WPC80 could have new uses as a foaming agent where existing WPC samples have poor performance. These uses could include an economical egg-white replacer in whipped products such as meringues, ice-cream and toppings.

TABLE 7

Comparative foaming and foam stability advantages of WPC80 (WPC80 chitosan) obtained according to present invention (using polymeric MF)

| | % Overrun | | Foam stability (mins) | |
|---|---|---|---|---|
| Sample ID | Averages | SD | Averages | SD |
| WPC80 chitosan 1 | 96.25 | 0.01 | 27.91 | 1.99 |
| WPC80 chitosan 2 | 96.45 | 0.13 | 30.68 | 2.27 |
| Commercial WPC80 | 88.15 | 0.14 | 1.92 | 0.24 |

TABLE 7-continued

Comparative foaming and foam stability advantages of WPC80 (WPC80 chitosan) obtained according to present invention (using polymeric MF)

| Sample ID | % Overrun | | Foam stability (mins) | |
| --- | --- | --- | --- | --- |
| | Averages | SD | Averages | SD |
| Control 1 | 0 | 0 | N/A | N/A |
| Control 2 | 0 | 0 | N/A | N/A |

Improved Functional Properties of the Novel WPC80.

Figure 10:
FIG. 10 is an image of beakers with 5% samples used for comparing the clarity of a WPC80 solution obtained according to the present invention (WPC80 Chitosan) with the clarity of a comparable commercially available WPC80 solution (WPC80 Commercial), WPC made without microfiltration or chitosan treatment (WPC Control), WPC made with microfiltration (WPC80 MF) and commercial WPI.

Chitosan-treated WPC80 (WPCC) was generated along with WPC80 powders made without any pretreatment (WPCA) and with samples that were MF but without the chitosan pretreatment step (WPCB). Samples were made in duplicate. MF system was operated at inlet and outlet pressures of 89-100 and 27-42 kPa, respectively, and no significant differences were observed in flux during processing runs of 3 to 4 h and concentrations factors that ranged from 1 to 12. Fat contents of WPCC, WPCB, and WPCA were 0.46%±0.07, 0.46%±0.02, and 6.56%±1.31, respectively. Turbidity of dissolved WPC80 powders was measured by absorbance at 500 nm. Absorbance values for WPCC, WPCB, and WPCA were 0.05±0.01, 0.08±0.01, and 2.61±0.20, respectively. Commercial samples of WPC80 (WPCG) and WPI (90% protein) had absorbance values of 2.91±0.10 and 0.08±0.02, respectively. The WPC80 made by MF technology alone was also relatively clear. However, it still retains the yellow color that might come from the annatto color used in cheesemaking (FIG. 10). This would be a limitation for clear beverage formulation and the diminishing or removal of color is another benefit to the novel WPC80.

Samples were subjected to accelerated storage (4 days, 60° C.); which is often used to test WPC samples for their likely development of off-flavors during storage, e.g. in a modified version of the method described by Lee, et al. 1996, *Int. Dairy J.* 6:485-496. WPCG and the WPCA browned considerably and developed a high quantity of off-flavors. WPCC remained white and WPCB underwent slight browning. Both exhibited little off-flavor development. GC-MS was used to evaluate the type and quantity volatiles in WPC samples. Thus, chitosan pretreatment in the production of WPC80 results in greatly improved clarity, suppressed off-flavor (FIGS. 8 and 9) and color development during accelerated storage, suggesting that the obtained ingredient could be used to fortify clear beverages or baking applications where browning is not desired.

Example 2

This is an example of scaling up the process according to the present invention.

Complexation.

Prior to the trial, about 600 grams (with 6.36% moisture) of grinded food grade chitosan (75-92% degree acetylation from Seltzer Chemical Inc.) was prepared into 1% chitosan in 10% acetic acid solution in three 5 gallons buckets. The 10% acetic acid was prepared by using Fisher glacial acetic acid and distilled water, and the grinded chitosan was dissolved overnight with an overhead mixer.

Cold 500 gallons of concentrated 19% total solids whey from local cheese plant was brought into UW-Madison Food Science/Wisconsin CDR pilot plant facility in two ~250 gallons containers. The whey was then transferred into a 500 gallons tank, stirred by an overhead mixer, and warmed by using hot water through the jacket of the 500 gallons tank to 25° C. for chitosan-residual lipids complexation reaction. Based on the preliminary smaller scale study, it was expected that 0.021% wt/liquid-wt chitosan addition to the 19% total solids whey would be the optimum amount but instead 0.028% was needed because of the increased ionic strength and viscosity of this concentrated whey.

The chitosan solution was added slowly. The initial pH of the whey prior chitosan solution addition was 6.03 and the final pH after addition was 5. The pH was immediately adjusted to target pH of 4.5 by addition of 10% acetic acid solution. The acid solution was also slowly added with gentle mixing to minimize localized protein denaturation. The agitation was then stopped and the mixture was incubated at room temperature of 25° C. After storage a clear supernatant was observed.

Separation by Microfiltration System.

In this larger-scale trial, polymeric membrane system of 0.3 micron pore size elements was chosen. Eight 46 mil spacer elements with dimension of 3.8 inches diameter and 30 inches long per elements were set up in 2 series—4 parallel configurations. The microfiltration system was driven by two frequency drive controlled centrifugal pumps. The supernatant from the 500 gallons tank was then siphoned into 130 gallons microfiltration feed tank by using a frequency drive controlled positive displacement pump. The siphoning was done very carefully with low pumping flow-rate, not to cause any excessive disturbances to the flocculates. The outlet of the pump was connected to a milk filter to trap large flocculates of the chitosan-residual lipids complexes. As the transferred supernatant reached 100 gallons, the siphoning was stopped and the microfiltration was started. The processing variables were: 28-29 psi inlet pressure, 4-5 psi outlet pressure, and 69-78° F. processing temperature. Low pressures were applied to minimize agitation of the complexes, which if excessive, might cause breaking of the complexes to be smaller than the pore size of the membrane elements.

The permeate was drawn and collected in 100 gallons and 200 gallons tanks and rapidly cooled to about 50° F. (the permeate was cooled in the 100 gallons tank and bled into the 200 gallons tank to obtain total MF permeate of about 300 gallons). As the MF permeates was drawn and collected, more of the whey supernatant feed was siphoned from the 500 gallons tank to the microfiltration feed tank. The siphoning was stopped when the level of the whey supernatant reached the concentrated region of the complexes that were settling at the bottom of the tank and about 320-350 gallons in total of the whey supernatant was collected. The level of the siphoned supernatant was monitored by turbidity measurement at 500 nm. Significant changes in the turbidity indicated that the concentrated flocculated region of the tank was reached. The MF processing lasted for about 2.5 hours and resulted in about 280-300 gallons of permeate. This permeate was then transferred into a 500 gallons tank with cooling water on the jacket of the tank for the next step of the processing (pH adjustment to pH>6.3). The feed rate was in the range of 22-25 gallons per minute and the permeate flux rate was 3.8 gallons per minute initially which dropped down to 1.2 gallons per minute by the end of the run. During the microfiltration process, permeate samples were collected over time and the turbidity was measured at 500 nm to monitor the quality of the separation. The final composite MF permeate had a pH of 4.54.

pH Adjustment Prior to Ultrafiltration and Diafiltration.

After MF processing, a pH adjustment step was done prior to concentration and washing (ultrafiltration-diafiltration) step. The objective of this step was to precipitate any excess of free chitosan in the MF permeate. The insoluble free chitosan can then be removed by an additional filtration step to minimize the presence of chitosan in the final product. Chitosan has a pKa of 6.3; thus, it is soluble in acid condition and insoluble at pH above 6.3. However, the pH adjustment step had to be done in such a way that protein denaturation was minimized. In this trial, an in-line feeding system was created by using a frequency drive centrifugal pump and 0.5-1 M sodium hydroxide was chosen for base addition. By creating an efficient turbulent mixing point and low concentration base, the potential for protein denaturation due to localized pH changes was suppressed.

A centrifugal pump with a feeding system was attached to the 500 gallons tank. 0.5-1 M sodium hydroxide was added through the hopper of the feeding system. The initial pH was 4.54 and permeate was adjusted to pH of 6.6 after addition of a total of 70 liter of 1 M sodium hydroxide. After pH adjustment, the MF permeate was stored overnight at 40° F. for subsequent ultrafiltration-diafiltration step.

A change in turbidity of the MF permeate before and after pH adjustment was noticeable and was monitored by absorbance measurements at 500 nm. The MF permeates prior to pH adjustment had an absorbance value of 0.022 while the MF permeates after adjustment had an absorbance value of 0.055. The changes of the absorbance values might be caused by protein denaturation due to localized pH changes and also by the formation of some insoluble chitosan at neutral pH (pH higher than 6.3).

Ultrafiltration and Diafiltration.

In this trial, four elements with 2 pumps-ultrafiltration systems with 2 series, 2 parallel configurations were used. The dimension of the membrane elements were: 4.3 inches diameter with 38 inches length, 46 mil spacers and 10 kDa cutoff. The MF permeate which was stored in the 500 gallons tank was transferred into 100 gallons UF feed tank using a centrifugal pump attached to the bottom of the 500 gallons tank. A milk filter was set up in-line with the pump to trap any large insoluble free chitosan particles. As the transferred volume reached 100 gallons, the ultrafiltration was started and permeate was drawn out into the drain. The loss of volume in the 100 gallons UF feed tank was compensated by the transferred volume of the MF permeate in the 500 gallons tank. The processing conditions were: inlet pressure of 58-60 psi, which were reduced to 52-53 psi at low volume; outlet pressure of 25 psi, which were reduced to 17-19 psi at low volume; and processing temperature of 43-62° F.

During the bleeding of the MF permeates in the 500 gallons tank to the 100 gallons ultrafiltration feed tank, a thin layer of sediment was observed at the bottom of the tank. Thus, the bleeding method was changed from pumping the liquid from the bottom of the tank to siphoning by using a positive displacement pump.

Water for washing was added as the level of the liquid in the 100 gallons feed tank was about 40-50 gallons. The flow rate of the water was maintained to be the same as the permeate flux rate when the volume in the feed tank reached 15-25 gallons level. During the process, both the retentate and the permeate refractive solids were monitored and targeted to have a minimum ratio of 10 to 1. At the end of the run, the inlet and outlet pressure was lowered as the concentration step resulted in liquid level less than 10 gallons (in the 100 gallons feed tank) to minimize foaming and protein denaturation.

The ultrafiltration-diafiltration process lasted for about 6 hours with permeation rate ranging from 0.9 to 1.5 gallons per minute. The initial refractive solids of the retentate and permeate were 14 and 12 while the final refractive solids were 18 and 1.2, respectively. The total volume of the final UF retentate collected was about 15 gallons, collected from the feed tank and mostly from the hold-up volume of the membrane system, and the pH was 6.83. The UF retentate was spray dried.

Results.

A scaled-up process was developed that successfully reduced the residual lipid content of WPC80 to less than 0.5%. The turbidity of the obtained WPC80 was around 0.08 (for a 5% solution measured at 500 nm), making the product superior in clarity to all commercial WPC80 samples that were tested. The fat content and turbidity were very comparable to clear WPI products currently on the market. The newly obtained WPC80 has functional properties superior to other commercially available WPC80. Some of the superior functional properties include sensory properties (less volatiles), solubility, and pH stability.

Accelerated storage testing on the obtained WPC80 powders was conducted. In these tests, the WPC80 sample obtained according to the present invention only produced a low concentration of off-flavors compared to a commercial WPC80 sample which produced considerable amount of volatiles. Commercial samples browned considerably during accelerated storage whereas the new WPC80 sample only developed slight browning. Low browning potential is a very important functional attribute of this WPC and limits the usefulness of WPCs in many food applications.

Quantification of Browning.

Quantification of browning may be performed on a variety of compositions, e.g. food products, which include the whey compositions of the present invention. Because the WPC obtained according to the present invention exhibits relatively lower browning, food products that include the produced WPC should also exhibit relatively less browning in comparison to food products that include conventionally obtained WPC. Quantification of browning may be performed on a variety of food products, including but not limited to powders (Dattatreya et al., 2006, *Int. Dairy J.* 17: 177-182), solutions (Venkatachalam et al., 1993, *J. Dairy Sci.* 76: 1882-1894), and solid food (Son et al., 2000, *J. Food Sci.* 65: 1288-1289).

In one example, quantification of browning may be performed using a Hunter Colorimeter (Dattatreya et al., 2006, *Int. Dairy J.* 17: 177-182). The variable L of the Hunter Colorimeter will measure the whiteness and dark (the more intense the brown color, the darker it should be) and the b variable of the Hunter Colorimeter would measure the degree of yellowness of the sample. The samples may be powder, solids, or solution. Preferably, white uniform background is used. Also preferably, the container should have flat surface for measurement, and the sample size should be a fit (e.g. the measured sample size should fit the container—occupy the container uniformly). For example, small disposable Petri dishes with white background can be used. Preferably, the quantification of the browning is conducted in at least 3 replicates to obtain statistically more accurate values.

It is to be understood that this invention is not limited to the particular devices, methodology, protocols, subjects, or reagents described, and as such may vary. It is also to be understood that the terminology used herein is for the purpose of describing particular embodiments only, and is not intended to limit the scope of the present invention, which is limited only by the claims. Other suitable modifications and adaptations of a variety of conditions and parameters, obvious to those skilled in the art of chemistry, biochemistry, molecular biology, and cheese, milk, and milk products manufacturing, are within the scope of this invention. All publications, patents, and patent applications cited herein are incorporated by reference in their entirety for all purposes.

What is claimed is:

1. A method of removing lipid from a protein and lipid-containing material, the method comprising:
    adding sufficient amount of chitosan to the protein and lipid-containing material to form a chitosan-lipid complex in solution, wherein the protein and lipid-containing material is whey;
    adjusting the solution to a pH of about 4.0 to 5.0;
    mixing the solution for a sufficient time to form a precipitate of the chitosan-lipid complex; and
    separating the chitosan-lipid complex from the solution using microfiltration to form a substantially lipid-free protein permeate, wherein the microfiltration is performed with a polymeric microfiltration membrane that has a pore size of from about 0.1 µm to about 1.0 µm, wherein the substantially lipid-free protein permeate comprises β-lactoglobulin.

2. A method of removing lipid from a protein and lipid-containing material, the method comprising:
    adding sufficient amount of chitosan to the protein and lipid-containing material to form a chitosan-lipid complex in solution;
    adjusting the solution to a pH of about 4.0 to 5.0;
    mixing the solution for a sufficient time to form a precipitate of the chitosan-lipid complex; and
    separating the chitosan-lipid complex from the solution using microfiltration to form a substantially lipid-free protein permeate, wherein the microfiltration is performed with a polymeric microfiltration membrane having a pore size of from about 0.05 µm to about 5.0 µm.

3. The method of claim 2, wherein the substantially lipid-free protein permeate is lactose-enriched.

4. The method of claim 2 wherein light absorption of a 5% aqueous solution of the substantially lipid-free whey protein permeate measured at 500 nm is less than 0.06 relative absorbance units.

5. The method of claim 2 wherein the polymeric microfiltration membrane has a pore size of from about 0.1 µm to about 1.0 µm.

6. The method of claim 2 wherein the polymeric microfiltration membrane is a spiral-wound polymeric microfiltration membrane.

7. The method of claim 2 wherein the microfiltration is performed at a temperature of between 5° C. and 55° C.

8. The method of claim 2 wherein the protein and lipid-containing material is whey.

9. The method of claim 8 further comprising clarifying the whey prior to adding chitosan.

10. The method of claim 2 wherein the substantially lipid-free protein permeate comprises β-lactoglobulin.

11. The method of claim 2, further comprising:
    adjusting the substantially lipid-free protein permeate to a pH of from about 6 to about 7 to precipitate unbound chitosan; and
    removing the unbound chitosan.

* * * * *